UNITED STATES PATENT OFFICE 2,575,713

DISINFECTANT COMPOSITION CONTAINING A CORROSION INHIBITOR

Sven Christian Johansson, Goteborg, Sweden

No Drawing. Original application May 7, 1946, Serial No. 668,010. Divided and this application July 19, 1948, Serial No. 39,582. In Sweden May 12, 1945

12 Claims. (Cl. 167—13)

This application is a division of my copending application Serial No. 668,010 filed May 2, 1946, now Patent No. 2,504,200.

The present invention relates to disinfectants, the object of the invention being to produce disinfectant compositions which will be of non-corrosive character. To this end the disinfectants are mixed with an aromatic hydroxycarboxylic acid with one or more nitro groups, or a compound in which the hydrogen of the carboxyl and/or hydroxyl groups of said acid is replaced by metal, ammonium, radical of organic base or other organic compound. The aromatic hydroxy-carboxylic acid may contain one or more carboxyl and hydroxyl groups. As examples the following acids may be mentioned: Mononitrohydroxybenzoic acid, dinitrohydroxybenzoic acid, mononitrohydroxyphthalic acid, dinitrohydroxyphthalic acid and homologues of these acids. The compounds here referred to exert their corrosion inhibiting action either as such or in more or less neutralized condition, I prefer, however, to use them in the form of salts or esters or compounds which are both salts and esters. Thus, either the hydrogen of the hydroxyl groups only or the hydrogen of the carboxyl groups only or the hydrogen of hydroxyl as well as carboxyl groups may be replaced by metal or organic radical. Of the metals, for example, the alkali metals and alkaline earth metals may be employed and of the former lithium has proved to be specially suitable in certain respects. The organic radicals may comprise amine radicals, alkyl, phenyl groups etc.

As examples of compounds, that have been tested and proved to have very good rust protecting properties, the following compounds of dinitroparahydroxybenzoic acid may be mentioned:

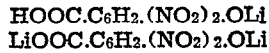
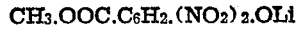

and

CH₃.OOC.C₆H₂.(NO₂)₂.OLi

The corresponding compounds of mononitroparahydroxybenzoic acid have also proved to be suitable for the purpose in question. Also the homologues of these compounds are useful for the same purpose. In the examples stated the oxy group is in para position to the carboxyl group but corresponding compounds of the oxy group in ortho or meta position may also be used.

The position of the nitro group or groups is of a certain importance since it is or they are most effective in ortho position to the oxy group. But compounds with the nitro groups in other positions are not excluded as nitrocompounds to be added to disinfectants.

As low a concentration as 1 part of weight of any of the compounds of nitroparahydroxybenzoic acid in 500,000 parts of weight of water prevents during a considerable time corrosion of ordinary iron and steel.

In the cases tested the compounds here referred to have no injurious effect on the disinfectants but they rather improve their sterilizing properties. In the use of ordinary corroding disinfectants a certain dissolution of metal out of the metal article to be sterilized takes place and there is danger that the metal dissolved will influence the composition of the disinfectant in an injurious way. Thus, in addition to preventing corrosion the nitrooxy compounds referred to will keep the disinfectants in unchanged condition. It should also be noted that metal objects will be easily covered by corrosion products (rust) when being treated with disinfectants without corrosion inhibiting agents. The pores of such corrosion products form places which are difficult for the disinfectant to reach and in which bacteria will find protection against the disinfectant which in such a case will be inactive against the bacteria. By the corrosion inhibiting substance the formation of places of the metal object difficult to sterilize is prevented, and thus the effect of the disinfectant will be improved. Only as an example it may be mentioned that an aqueous solution of 5% of the antiseptic agent chloramine with the lithium salt of dinitrohydroxybenzoic acid with the concentration 1:2,000 will in 48 hours not exert any corrosion on iron and steel.

The corrosion test has been made with ordinary steel. The corrosion rate depends, of course, not only on the composition of the solution but also on other factors such as temperature, kind of steel, admission of air, the material of the vessel employed for the solution, etc.

Also other disinfectants may be made non-corrosive by the addition of a slight quantity of the nitrooxy compounds above mentioned. Such disinfectants are, for example: hypochlorites (e. g. sodium hypochlorite, chlorite of lime), hydrogen peroxid, iodine (e. g. iodine dissolved in alcohol), bromine, iodine compounds and bromine compounds, such as iodoform and bromoform, sublimate and other mercury compounds such as mercurochrome, phenylmercury salts, disinfectants containing formalin, e. g. mixtures of formalin and alcohol, formaldehyde-soap-solutions, phenol, cresol, thymol, naphthol, certain alkyl and acyl resorcinols, benzoic acid, esters thereof and homologues acridine derivatives, diamidines, etc.

The disinfectant constituent and the corrosion inhibiting constituent or constituents may be mixed with each other in the form of a molecular or colloidal solution, dispersion or emulsion. The constituents may, of course, if possible and desired, be mixed with each other in solid form in suitable proportions, e. g. as powder or tablets.

What I claim is:

1. A disinfectant composition, non-corrosive to metals in the presence of water, the essential effective ingredients of which consist essentially of a bactericidal agent and an appreciably lesser amount than it of a corrosion inhibiting agent sufficient to manifest its corrosion inhibiting effectiveness in the presence of water when the bactericidal agent is present in the water in a bactericidally effective concentration, said corrosion inhibiting agent having the general formula:

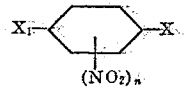

wherein $X_1$ is an oxy-group linked by its oxygen to a ring carbon and is a member of the class consisting of the hydroxyl, and the ammonium, alkali metal, and alkaline earth metal hydroxylate groups; X is a carbonyl-oxy group linked by the carbon of its carbonyl portion to a ring carbon in para-position to group $X_1$, said carbonyl-oxy group being a member of the class consisting of the carboxyl, carbalkoxy, and the ammonium, alkali metal and alkaline earth metal carboxylate groups and $n$ is a whole number less than three.

2. A disinfectant composition as claimed in claim 1, wherein a nitro group is in ortho position to the group $X_1$.

3. A disinfectant composition as claimed in claim 2, wherein $n$ is two.

4. A disinfectant composition as claimed in claim 3, wherein the group $X_1$ is O·Li.

5. A disinfectant composition as claimed in claim 4, wherein the group X is the carboxyl group.

6. The disinfectant composition as claimed in claim 4, wherein the group X is the carbmethoxy group.

7. A disinfectant composition as claimed in claim 4, wherein the group X is the CO·OLi group.

8. A disinfectant composition as claimed in claim 2, wherein $n$ is one.

9. A disinfectant composition as claimed in claim 8, wherein $X_1$ is —O·Li.

10. A disinfectant composition as claimed in claim 9, wherein X is —CO·OLi.

11. A disinfectant composition as claimed in claim 8, wherein X is a carboxylate group.

12. A disinfectant composition as claimed in claim 11, wherein X is the group —CO·OLi.

SVEN CHRISTIAN JOHANSSON.

REFERENCES CITED

The following references are of record in the file of this patent:

UNITED STATES PATENTS

| Number | Name | Date |
|---|---|---|
| 1,983,031 | Hinebaugh | Dec. 4, 1934 |
| 2,281,857 | Moore | May 5, 1942 |
| 2,334,153 | Fuchs et al. | Nov. 9, 1943 |
| 2,344,404 | Giloy | Mar. 14, 1944 |
| 2,366,074 | Wasson et al. | Dec. 26, 1944 |
| 2,432,901 | Johansson | Dec. 16, 1947 |
| 2,504,290 | Johansson II | Apr. 18, 1950 |

FOREIGN PATENTS

| Number | Country | Date |
|---|---|---|
| 681,916 | Germany | Oct. 4, 1939 |

OTHER REFERENCES

Bushland—J. Econ. Ent., vol. 33, pp. 669–676, August 1940.

Beilstein, vol. 10, p. 118.